(12) United States Patent
Kitano

(10) Patent No.: US 6,504,598 B2
(45) Date of Patent: *Jan. 7, 2003

(54) ILLUMINATION DEVICE

(75) Inventor: Hirohisa Kitano, Osaka (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,021

(22) Filed: Apr. 8, 1999

(65) Prior Publication Data

US 2002/0012111 A1 Jan. 31, 2002

(30) Foreign Application Priority Data

Apr. 10, 1998 (JP) .......................................... 10-099651

(51) Int. Cl.$^7$ ..................... G03B 27/72; G03B 27/54; G03B 27/52
(52) U.S. Cl. ............................. 355/71; 355/67; 355/69; 355/40
(58) Field of Search ............................. 355/71, 67, 35, 355/40, 74, 69, 34, 121, 124; 358/75, 42, 38; 348/743, 270

(56) References Cited

U.S. PATENT DOCUMENTS

| | | | | |
|---|---|---|---|---|
| 2,571,697 A | * | 10/1951 | Evans .......................... 430/30 |
| 3,732,357 A | * | 5/1973 | Rushing et al. ......... 178/5.4 CF |
| 4,029,391 A | * | 6/1977 | French ...................... 350/96 C |
| 4,054,931 A | * | 10/1977 | Bolton et al. .................. 360/97 |
| 4,353,641 A | * | 10/1982 | Merlo .......................... 355/38 |
| 4,369,475 A | * | 1/1983 | Ho et al. ....................... 360/97 |
| 4,375,647 A | * | 3/1983 | Mir .............................. 358/75 |
| 4,786,947 A | * | 11/1988 | Kosugi et al. ................. 355/30 |
| 4,851,899 A | * | 7/1989 | Yoshida et al. ............... 358/42 |
| 5,233,385 A | * | 8/1993 | Sampsel ...................... 355/35 |
| 5,309,227 A | * | 5/1994 | Inoue .......................... 348/71 |
| 5,371,543 A | * | 12/1994 | Anderson ................... 348/270 |
| 5,777,694 A | * | 7/1998 | Poradish .................... 348/743 |
| 5,790,238 A | | 8/1998 | Ishikawa et al. |
| 5,868,482 A | * | 2/1999 | Edlinger ...................... 353/84 |
| 6,048,080 A | * | 4/2000 | Belliveau .................... 362/282 |

* cited by examiner

Primary Examiner—Henry Hung Nguyen
(74) Attorney, Agent, or Firm—McDermott, Will & Emery

(57) ABSTRACT

An illumination device used in a printing head of a printer, which is capable of switching color of light emitted from a light source quickly. The illumination device has a color wheel that includes at least three grass panels having a fan-like shape and switches the color of light by rotating. The grass panels of the color wheel are supported by a circumferential ring at these exterior circumference. Thereby, the grass panels are hard to be damaged even when the color wheel is rotated at a high speed so as to switch the color of light quickly.

16 Claims, 8 Drawing Sheets

ILLUMINATION DEVICE

CROSS-REFERENCE TO RELATED APPLICATIONS

This application is based on Japanese Patent Application No. HEI 10-99651 filed in Japan on Apr. 10, 1998, the content of which is hereby incorporated by reference.

BACKGROUND OF THE INVENTION

1. Field of the Invention

The present invention relates to an illumination device provided with a rotating panel for switching color of illumination light.

2. Description of the Related Art

Conventionally, printers have been proposed which are provided with a printing head using a light shutter that comprises, for example, a PLZT. Furthermore, printing heads have been proposed which are provided with an illumination device having a rotating panel to modulate light emitted from a light source into light of each color red (R), green (G) and blue (B) and direct the modulated light to the light shutter.

The general construction of a full color printer provided with a PLZT printing head is described below. FIG. 10 briefly shows a partial construction of the full color printer. Part of light emitted from a halogen lamp 21 as a light source is directed to an illumination device 24 by an aluminum pipe 23. Only a color wheel 11 is shown in the drawing as a rotating panel forming a structural element of the illumination device 24, and other structural elements which are not illustrated include a drive source for driving the rotation of the color wheel 11, and a housing for accommodating the color wheel 11. Reference number 22 refers to a light-transmitting heatproof filter for blocking the heat generated by the halogen lamp 21.

The color wheel 11 of the illumination device 24 is provided with a plurality of glass panels as transparent members sequentially arranged in a direction of rotation of the color wheel 11. The light emitted from the halogen lamp 21 passes through the pipe 23 and is modulated sequentially to R, G, B by the respective glass panels via the rotation of the color wheel 11. Details of the construction of the color wheel 11 and the illumination device 24 are described later.

Reference number 25 is a fiber bundle comprising a lot of plastic fibers. The light modulated by the illumination device 24 (i.e., color wheel 11), is transmitted within the fibers to a polarizer 26. The fiber bundle 25 has a circular cross section on the color wheel 24 side, and the fibers are arranged in a linear array on the polarizer 26 side.

Only the light oscillating in a predetermined direction is transmitted through the polarizer 26. The light which is transmitted through the polarizer 26 further passes through an integrator 27 to suppress dispersion. A shutter array 28 is a member in which a plurality of PLZT elements as optical shutters is arranged in the form of an array, and these shutters are turned ON and OFF via the application of a voltage to the PLZT elements. The light passing through the shutter array 28 arrives at an analyzer 29, and only the light oscillating in a predetermined direction passes through the analyzer 29. The light passing through the analyzer 29 forms an image on a color photographic paper 31 as a recording medium via a lens 30. A full color image is printed on the photographic paper 31 by regulating an amount of R, G, B light via the shutter array 28.

The color wheel 11 is described below. FIG. 11 is a top view of the color wheel 11. FIG. 12 is a cross section view on an A–A' plane in FIG. 11. Glass panels 1r, 1g and 1b are each 1 mm thick, and are processed such that these have a fan-like shape with an interior angle of 60°. The glass panels 1r, 1g and 1b are optically coated so as to modulate white light transmitted therethrough to R (1r), G (1g), B (1b) light, respectively. That is, the glass panels 1r, 1g and 1b have mutually different light transmitting characteristics. The glass panels 1r, 1g and 1b respectively comprise a pair of elements, for a total of six elements.

A top flange 2 and a bottom flange 3 fixedly hold the glass panels 1r, 1g and 1b. The top flange 2 and bottom flange 3 made of aluminum both have a disk-like shape. The bottom flange 3 is provided with an opening 3a on its center. A wall 3b is formed on one side of the bottom flange 3 along a circumferential edge of the opening 3a.

The glass panels 1r, 1g and 1b are locked by the top flange 2 and the bottom flange 3 as described below. The bottom flange 3 is disposed with a surface on which the wall 3b is formed facing upward, and the glass panels 1r, 1g and 1b are placed on the bottom flange 3 and abut the wall 3b, such that like color panels face one another across the center. Then, the top flange 2 is overlaid onto the bottom flange 3 so as to hold the glass panels 1r, 1g and 1b between the two flanges, and the top flange 2 is fixed to the bottom flange 3 via adhesive or screws or the like.

By the way, in the full color printer provided with the PLZT printing head of the aforesaid construction, the color wheel 11 must rotate at approximately 12000 rpm to attain a desirable printing speed. When rotating at such a high speed, however, the color wheel 11 is subject to extremely large centrifugal force which rapidly causes damage to the glass panels 1r, 1g and 1b.

Gaps may be generated at mutual connective regions of the glass panels 1r, 1g and 1b of the color wheel 11 due to measurement discrepancies during manufacture. Light may disadvantageously leak from these gaps, and adversely affect printing.

Furthermore, another problem occurs when the color wheel 11 rotates. FIG. 13 is a side section view of a conventional illumination device 24. The color wheel 11 is accommodated in a dustproof housing 8. A motor 10 as a drive source is provided in the opening 3a of the bottom flange 3 of the color wheel 11 (refer to FIG. 12). The color wheel 11 is rotated within the housing 8 via the drive provided by the motor 10. The light emitted from the halogen lamp 21 (refer to FIG. 10) enters the color wheel 11 through an entrance window (not illustrated) in the housing 8, passes through the glass panel 1r (or 1g, or 1b), and is emitted from an exit window (not illustrated) in the housing 8.

As shown in the drawing, the housing 8 has two mutually opposing surfaces parallel to the rotational plane of the color wheel 11, i.e., a bottom surface of the housing body 8a and the back surface of the housing cover 8b. The color wheel 11 is disposed within these two surfaces so as to be closer to the housing body 8a. When the color wheel 11 is rotated, the area near the rotational axis and the area of the exterior circumference have different circumferential speeds, such that an airflow is generated from the center of the color wheel 11 toward the exterior side in a space (B) between the color wheel 11 and the housing body 8a (indicated by an arrow 12 in the drawing).

The space (B) is subject to a low air pressure condition due to this airflow 12, which produces a force in a downward direction (indicated by an arrow 14 in the drawing) on the color wheel 11. The rotational balance of the color wheel 11 is disrupted under the effects of this downward force, and rotational stability is lost. These effects are particularly pronounced when an air motor is used as the drive source.

OBJECTS AND SUMMARY

An object of the present invention is to eliminate the previously described disadvantages by providing an improved illumination device.

Another object of the present invention is to provide an illumination device provided with a rotating panel capable of high-speed rotation.

Still another object of the present invention is to provide an illumination device which does not leak light from a rotating panel.

Yet another object of the present invention is to provide an illumination device capable of stable rotation of a rotating panel.

These objects are attained by providing an illumination device comprising:

a rotating panel including a plurality of transparent members having different light transmitting characteristics sequentially arranged in a rotational direction of the rotating panel; and a frame member arranged on an exterior circumference of the rotating panel for supporting the plurality of transparent members.

In this illumination device, the transparent members are hard to be damaged even when subjected to centrifugal force via the rotation of the rotating panel because the transparent members are supported by the frame member.

In this illumination device, the frame member may be adhered to the transparent members via adhesive. In this case, even when dimension discrepancies occur during the manufacture of the transparent members and the frame member, the looseness is absorbed by the adhesive.

These objects are further attained by providing an illumination device comprising:

a rotating panel including a plurality of transparent members having different light transmitting characteristics sequentially arranged in a rotational direction of the rotating panel; and a light shield member for sealing between adjacent transparent members.

In this illumination device, even when gaps occur at the connective regions between transparent members, light is prevented from leaking by the light shield member.

These objects are further attained by providing an illumination device comprising:

a rotating panel including a plurality of transparent members having different light transmitting characteristics sequentially arranged in a rotational direction of the rotating panel; and a housing for accommodating the rotating panel, said housing having two mutually opposing surfaces parallel to a rotational plane of the rotating panel, and having an airflow inlet near a rotational axis of the rotating panel on a surface nearer to the rotating panel among the two surfaces.

In the space between the rotating panel and the surface nearer to the rotating panel in this illumination device, airflow is generated from the center of the rotating panel toward the exterior side thereof, but there is no change in air pressure in this space because external air inflows to the space from the airflow inlet.

In this illumination device, a plurality of the airflow inlets may be disposed at equal intervals on a circumference centered on a position corresponding to a rotational axis of the rotating panel. In this case, air flowing from the airflow inlet is not deflected so as to maintain equal air pressure in the space.

In this illumination device, a filter may be provided at the airflow inlet. In this case, external air flowing into the housing is clean because the filter traps dust etc.

In this illumination device, the housing also may be provided with an airflow outlet near an exterior circumference of the rotating panel on the surface provided with the airflow inlet. In this case, there is no change in air pressure in the space because exterior air flows into the housing from the airflow inlet, and air inside the housing is discharged from the airflow outlet.

In this illumination device, the housing may be provided with a pipe connecting the airflow inlet and the airflow outlet. In this case, there is no change in air pressure in the space because an airflow is generated circulating through the pipe and the space.

A plurality of the airflow inlets and the airflow outlets may be arranged at equal intervals on respective circumferences centered on a position corresponding to a rotational axis of the rotating panel. In this case, a constant air pressure is maintained in the space because the inflow and discharge of air from the airflow inlet and the airflow outlet are not deflected.

These objects are further attained by providing an illumination device comprising:

a rotating panel including a plurality of transparent members having different light transmitting characteristics sequentially arranged in a rotational direction of the rotational panel; and a housing for accommodating the rotating panel, wherein the rotating panel is accommodated in the housing so as to maintain equal distance from two mutually opposing surfaces of the housing parallel to a rotational plane of the rotating panel.

In this illumination device, an equal airflow is generated in both spaces between the rotating panel and the two surfaces of the housing, and pressure is hard to be exerted on the rotating panel due to deflection of air pressure because the spacing between the rotating panel and the two surfaces of the housing are equal.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

The preferred embodiments of the present invention are described hereinafter with reference to the accompanying drawings. In the following description, like structural elements common to the conventional art of FIGS. 10 through 13 are designated by like reference numbers throughout the several drawings, and duplicative descriptions are omitted.

Figure 1:
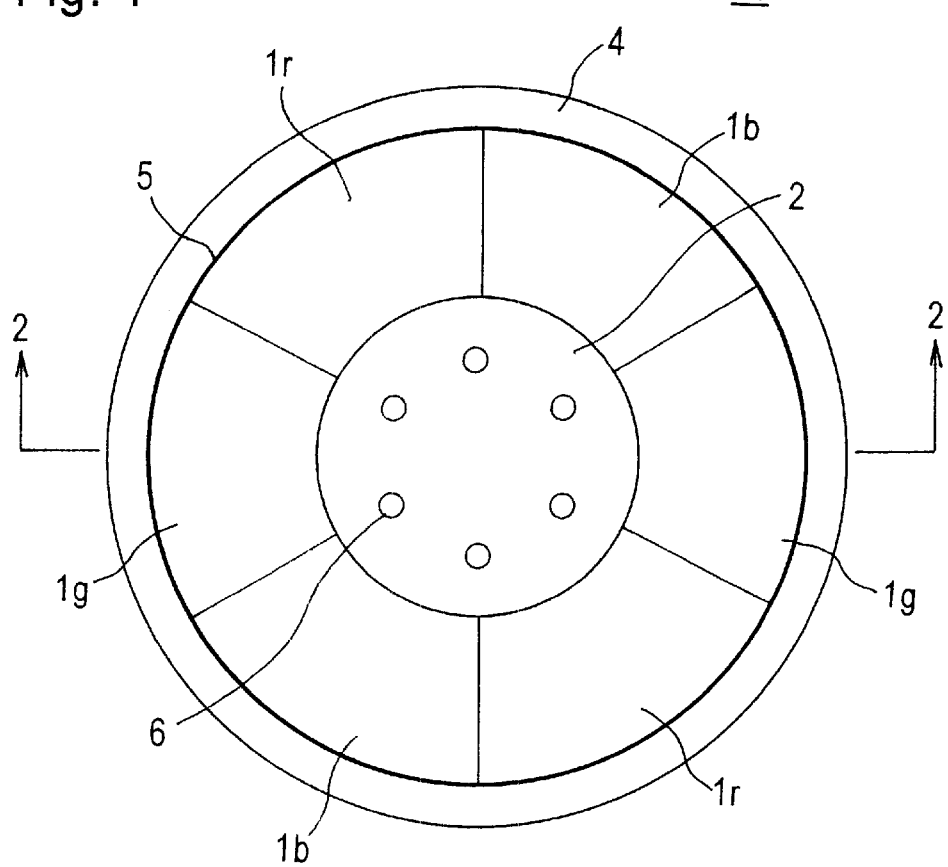
FIG. 1 is a top view of a color wheel of an illumination device of a first embodiment of the invention.
Figure 2:
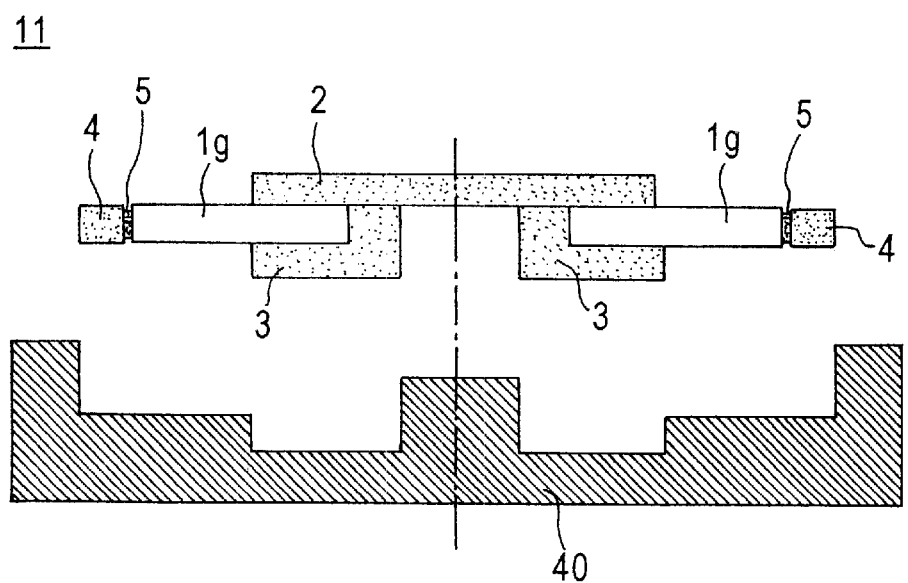
FIG. 2 is a side section view of an assembly tool and the color wheel of the illumination device of the first embodiment.

FIG. 1 is a top view of a color wheel 11 of an illumination device of a first embodiment of the present invention. FIG. 2 is a section view of the color wheel 11 on an A–A' plane of FIG. 1, and is a side section view of a tool used for assembling the color wheel 11. The color wheel 11 of the present embodiment is provided with a circumferential ring 4 as a frame member on an exterior circumference of glass panels 1r, 1g and 1b.

A method of assembling the color wheel 11 is described below. First, a bottom flange 3 and the circumferential ring 4 are mounted on an assembly tool 40 as shown in FIG. 2. Then, the glass panels 1r, 1g and 1b are placed on the bottom flange 3. At this time, the glass panels 1r, 1g and 1b are pressed against the inner side of the circumferential ring 4, and an epoxy adhesive 5 is loaded between the circumferential ring 4 and the glass panels 1r, 1g and 1b to bond the elements. A top flange 2 is placed on top of the assembly and attached to the bottom flange 3 via screws 6. At this time, adhesive may also be loaded between the glass panels 1r, 1g and 1b and the flanges 2 and 3.

In the illumination device of the present embodiment, the glass panels 1r, 1g and 1b are hard to be damaged even when a large centrifugal force is generated by a rotation of the color wheel 11 because the glass panels 1r, 1g and 1b are supported by the circumferential ring 4. Furthermore, even when some looseness is produced by dimensional discrepancies between the circumferential ring 4 and the glass panels 1r, 1g and 1b, this looseness is absorbed by the adhesive 5 loaded between the elements. Accordingly, the circumferential ring 4 stably supports the glass panels 1r, 1g and 1b, and prevents damage to the glass panels 1r, 1g and 1b.

When the color wheel of the aforesaid construction was actually rotated by a DC brushless motor, the glass panels were undamaged even at a rotational speed of 12000 rpm. According to the illumination device of the present embodiment, color of illumination light can be switched quickly, and a fast printing speed is the result when used in a printer.

Figure 3:
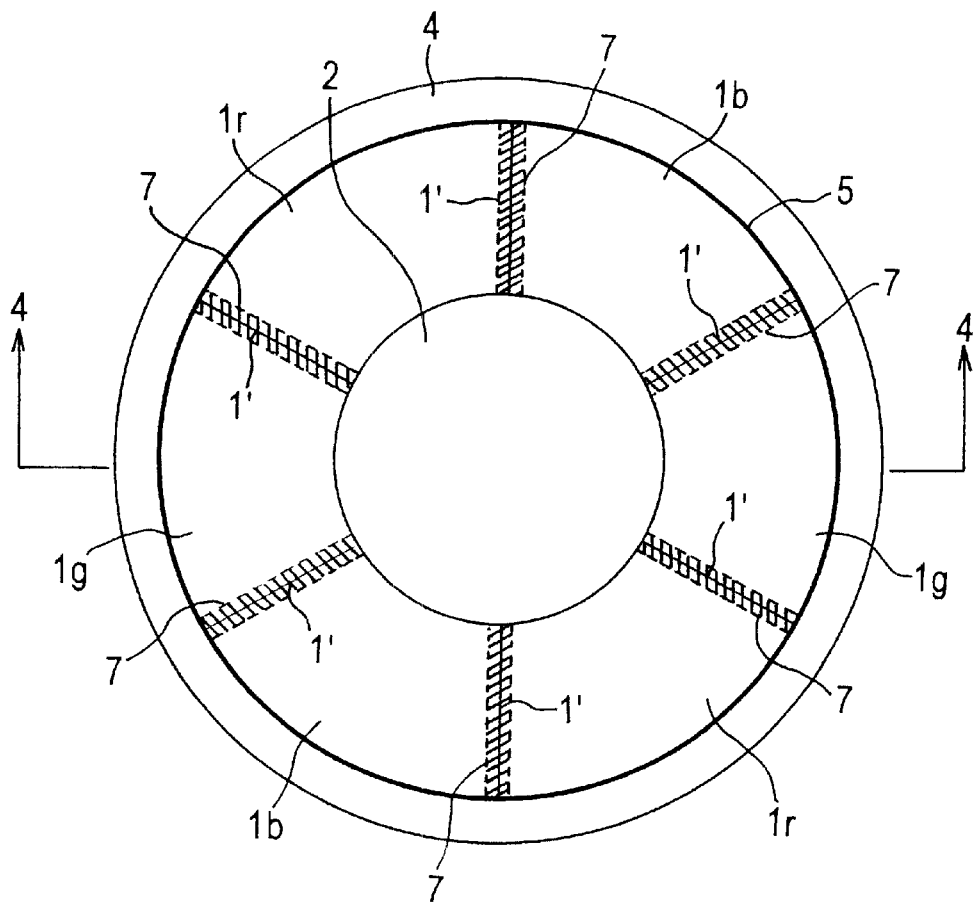
FIG. 3 is a top view of a color wheel of an illumination device of a second embodiment of the invention.
Figure 4:
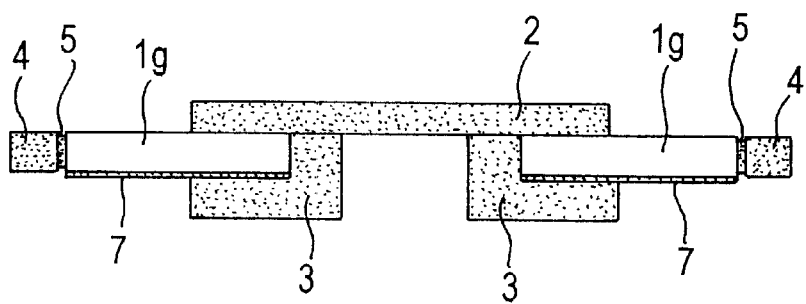
FIG. 4 is a side section view of the color wheel of the illumination device of the second embodiment.

FIG. 3 is a top view of a color wheel 11 of an illumination device of a second embodiment of the present invention. FIG. 4 is a section view of the color wheel 11 on an A–A' plane of FIG. 3. This color wheel 11 differs from the color wheel of the first embodiment shown in FIGS. 1 and 2 in that light shield sheets 7 are provided as light shield members straddling connective areas 1' between glass panels 1r, 1g and 1b. As shown in FIG. 4, the light shield sheets 7 are adhered to the surfaces of the glass panels 1r, 1g and 1b on the bottom flange 3 side. In other aspects of this illumination device are identical to the illumination device (or color wheel) of the first embodiment.

In the illumination device of the present embodiment, even when gaps occur in connective areas 1' between the glass panels 1r, 1g and 1b, these gaps are filled by the light shield sheets 7. For this reason, the illumination device of the present embodiment eliminates the disadvantage of the adverse affects on printing caused by light leaking from the color wheel 11.

Figure 5:
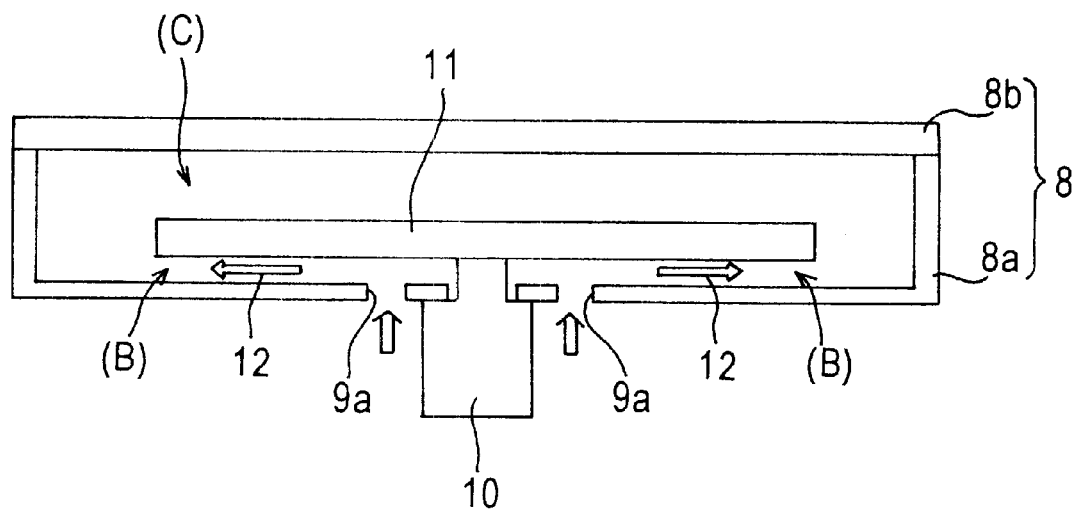
FIG. 5 is a side section view of an illumination device of a third embodiment of the present invention.

FIG. 5 is a side section view of an illumination device 24 of a third embodiment of the invention. As shown in the drawing, a housing body 8a is provided with airflow inlets 9a at positions near a rotational axis of a color wheel 11. The airflow inlets 9a are provided at equal intervals on a circumference centered on a position corresponding to the rotational axis of the color wheel 11.

In the illumination device 24 of this embodiment, a space (B) between the color wheel 11 and the housing body 8a is small relative to a space (C) between the color wheel 11 and a housing cover 8b, such that an airflow (indicated by an arrow 12) is generated from the center of the color wheel 11 toward the exterior side in the space (B). However, since airflow inlets 9a are provided on the space (B) side, exterior air flows in from the airflow inlets 9a, and air pressure in the space (B) does not change. Since the airflow inlets 9a are provided at equal intervals on the circumference centered on the position corresponding to the rotational axis of the color wheel 11, the entering airflow is not deflected, and a constant air pressure is maintained in the space (B).

Figure 6:
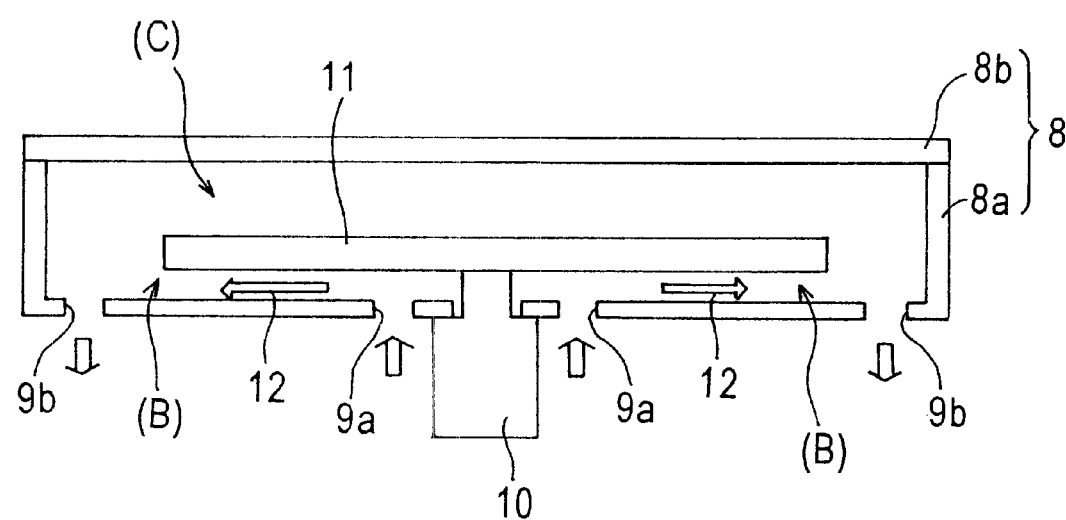
FIG. 6 is a side section view of an illumination device of a fourth embodiment of the invention.

FIG. 6 is a side section view of an illumination device 24 of a fourth embodiment of the invention. This illumination device 24 differs from the illumination device 24 of the third embodiment shown in FIG. 5 in that airflow outlets 9b are provided at positions in a housing body 8a near a circumferential area of a color wheel 11. The airflow outlets 9b are provided at equal intervals in housing body 8a on a circumference centered on a position corresponding to a rotational axis of the color wheel 11. Other structural aspects are identical with those of the illumination device of the third embodiment.

In the illumination device 24 of the present embodiment, an airflow (indicated by an arrow 12 in the drawing) is generated from a center of the color wheel 11 toward the exterior side thereof in a space (B) between the color wheel 11 and the housing body 8a, identical to the airflow in the illumination device 24 of the third embodiment. At this time, exterior air inflow through the airflow inlets 9a, and the air within the housing 8 is discharged via the airflow outlets 9b, such that the air pressure in the space (B) does not change. Since the airflow inlets 9a and the airflow outlets 9b are provided at equal intervals on the circumferences centered on the position corresponding to the rotational axis of the color wheel 11, the inflowing air and the outflowing air are not deflected, and a constant air pressure is maintained in the space (B).

Figure 7A:
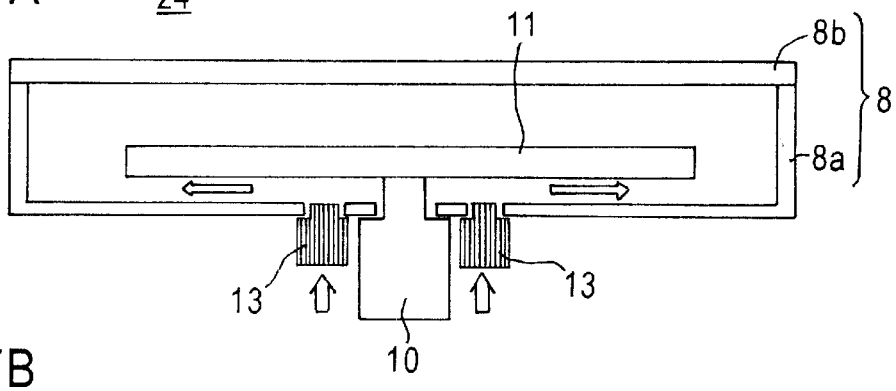
FIGS. 7A and 7B are side section views of modifications of the illumination device of the third and fourth embodiments.
Figure 7B:
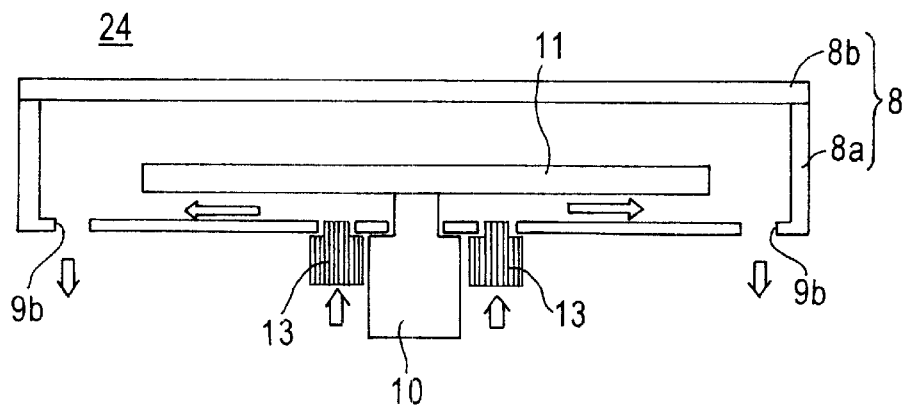

In the illumination devices 24 of the third and fourth embodiments, air filters may be installed in the airflow inlets 9a. FIGS. 7A and 7B are respective side section views of devices provided with air filters 13 in the airflow inlets 9a of the illumination devices 24 of the third and fourth embodiments. Since this air filters 13 trap the dust in the air entering through the airflow inlets 9a, the air within the housing 8 is clean, and dirt adhering to the color wheel 11 is greatly suppressed.

Figure 8:
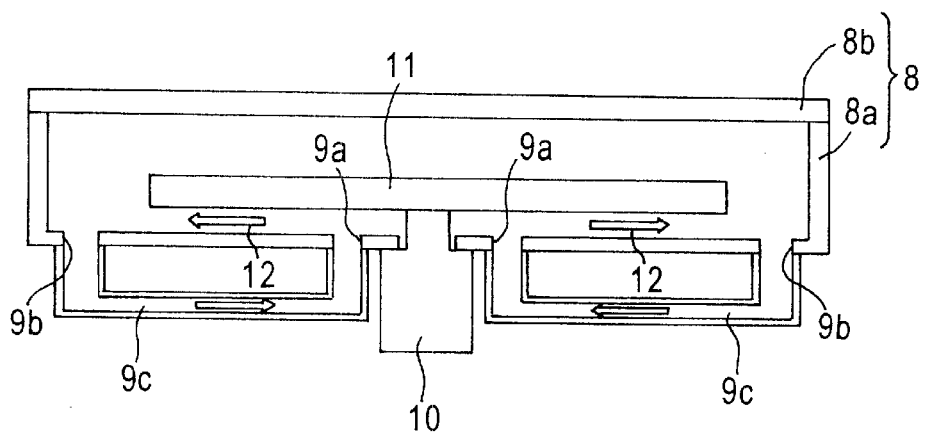
FIG. 8 is a side section view of an illumination device of a fifth embodiment of the invention.

FIG. 8 is a side section view of an illumination device 24 of a fifth embodiment of the invention. This illumination device 24 differs from the illumination device 24 of the fourth embodiment of FIG. 6 in that connecting pipes 9c are provided to connect the airflow inlets 9a and the airflow outlets 9b. Other structural aspects of the device are identical to the illumination device 24 of the fourth embodiment.

In the illumination device 24 of the present embodiment, an airflow (indicated by an arrow 12 in the drawing) is generated from a center of a color wheel 11 toward an exterior side thereof in a space between the color wheel 11 and a housing body 8a, identically to the illumination device 24 of the fourth embodiment. Since this airflow 12 circulates through the connecting pipes 9c, the air pressure in the space does not change.

Figure 9:
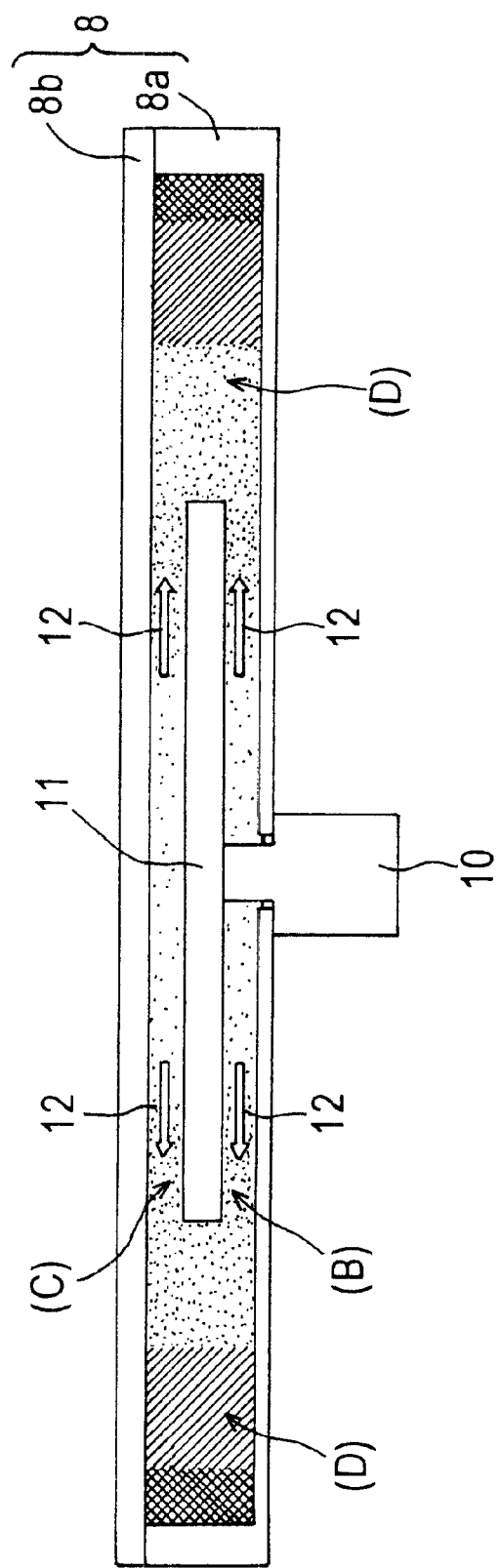
FIG. 9 is a side section view of an illumination device of a sixth embodiment of the invention.

FIG. 9 is a side section view of an illumination device 24 of a sixth embodiment of the invention. As shown in the drawing, in the illumination device 24 of this embodiment, a color wheel 11 is accommodated within a housing 8 such that a space (B) between the color wheel 11 and a housing body 8a and a space (C) between the color wheel 11 and a housing cover 8b are identical in size. The housing 8 is provided with a space (D) which is larger than the conventional housing 8 (refer to FIG. 13) on an exterior side of the color wheel 11.

In the illumination device 24 of the present embodiment, an airflow (indicated by an arrow 12 in the drawing) is generated from a center of the color wheel 11 toward the exterior side thereof in the space (B) and space (C), so that a low air pressure condition exists in both space (B) and space (C). Since there is no difference in the air pressure in the space (B) and the space (C), there is no deflection force (indicated by the arrow 14 in FIG. 13) exerted on the color wheel 11 as is the case conventionally. The air in the space (B) and the space (C) moves to the space (D) of the housing 8 via the airflow 12, and a high air pressure condition exists in the space (D) to maintain a constant low air pressure condition in the spaces (B) and (C).

Figure 10:
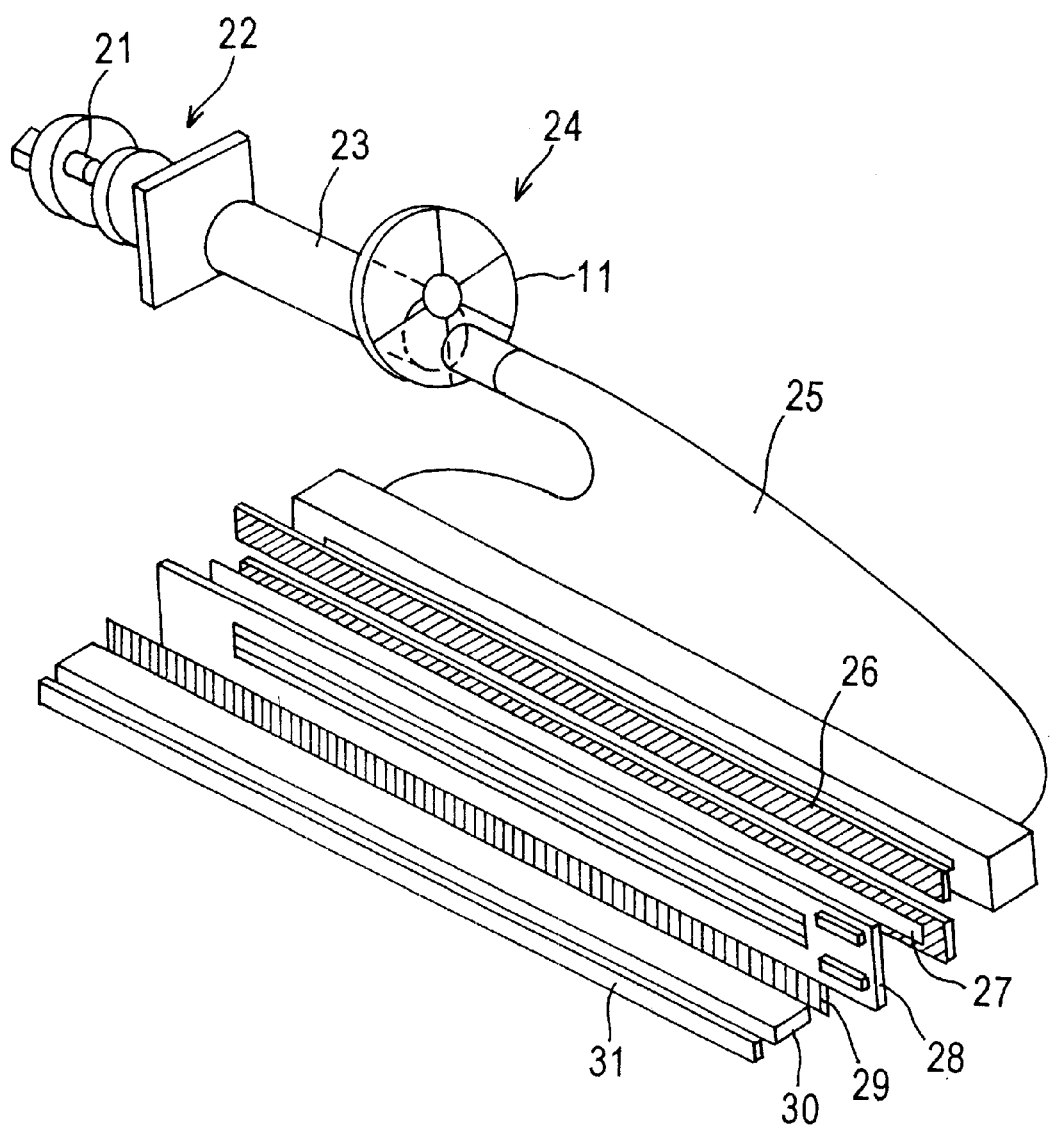
FIG. 10 briefly shows a construction of a full color printer provided with a PLZT printing head.
Figure 11:
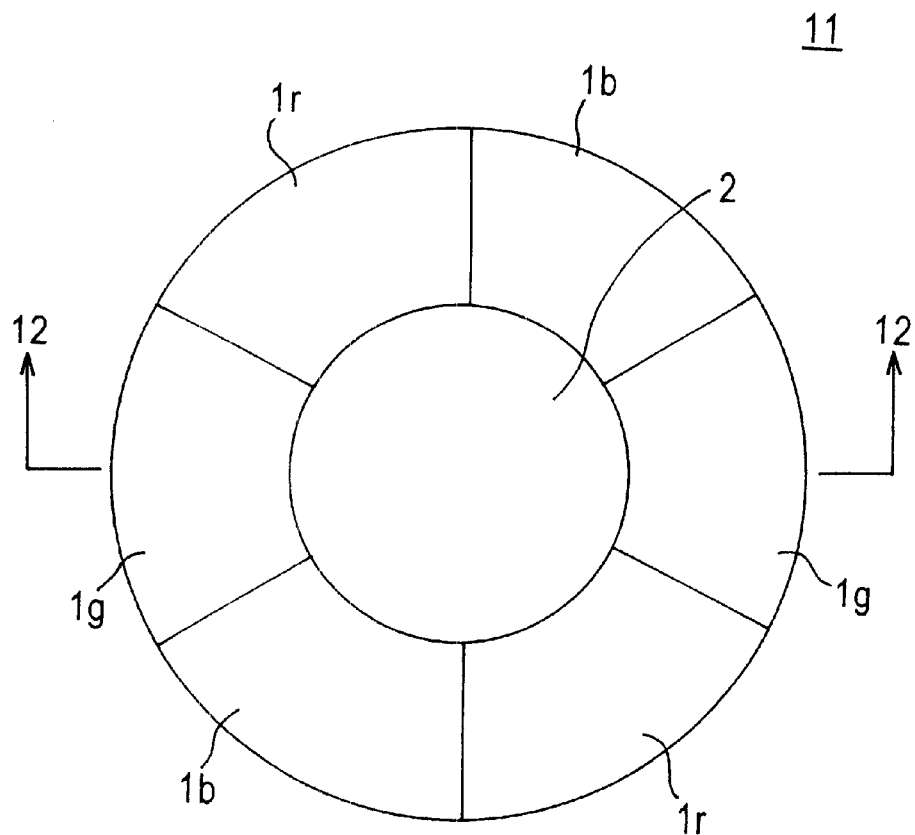
FIG. 11 is a top view of a color wheel of a conventional illumination device.
Figure 12:
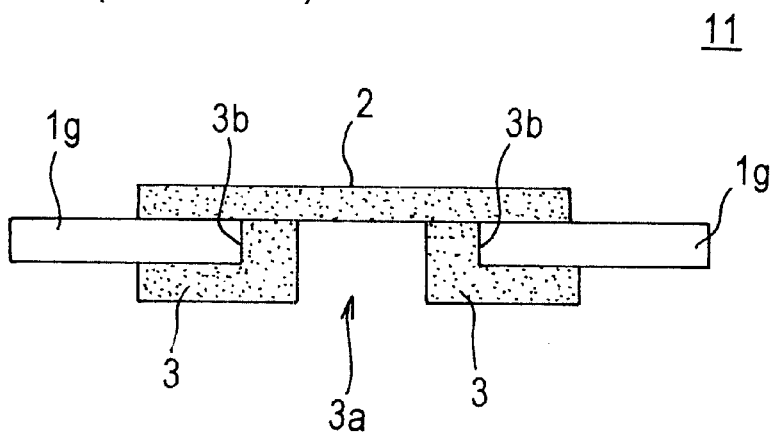
FIG. 12 is a side section view of the color wheel of the conventional illumination device.
Figure 13:
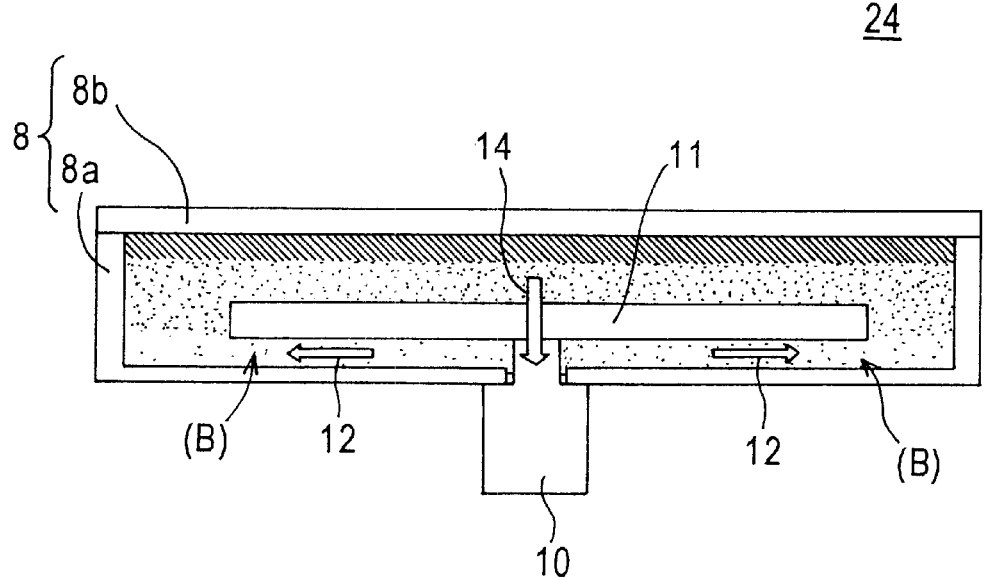
FIG. 13 is a side section view of the conventional illumination device.

Each of the illumination devices of the first through the sixth embodiments are applied to a full color printer using a PLZT printing head as shown in FIG. 10, and the color of the glass panels 1r, 1g and 1b are designated R, G, B. However, it is naturally possible to use glass panels of other colors. The illumination device of the present invention is an illumination device which sequentially switches color of light, and as such is not only applicable to printers, but also to other devices.

As described above, the illumination device of the present invention is provided with a frame member on an exterior circumference of a rotating panel, and, therefore, the rotating panel is supported by the frame member such that transparent members of the rotating panel are hard to be damaged even when a very large centrifugal force is exerted on the rotating panel. For this reason, the rotating panel is capable of high-speed rotation, and allows color of light to be switched rapidly. When adhesive is loaded in gaps between the transparent members and the frame member in the illumination device, any looseness between the members is absorbed by the adhesive. For this reason, the transparent panels are supported stably by the frame member and are hard to be damaged even when a very strong centrifugal force is exerted.

In another illumination device of the present invention, a light shield member is provided in a connective region between the transparent panels, so as to block light from leaking from gap in the connective region. In this way, the illumination device prevents light from leaking from the rotating panel.

In another illumination device of the invention, a housing is provided with an airflow inlet and an airflow outlet, such that air pressure within the housing does not change even when an airflow is generated within the housing by the rotation of the rotating panel. For this reason, in this illumination device, a deflection force is not exerted on the rotating panel due to a change in air pressure within the housing, thereby providing stable rotation of the rotating panel. Furthermore, since dust is removed from an air flowing into the housing when a filter is provided in the airflow inlet, the air within the housing remains clean, and dirt adhesion to the rotating panel is greatly suppressed.

In yet another illumination device of the present invention, the rotating panel is accommodated within the housing so as to maintain the two mutually opposing surfaces of the housing parallel to the rotational plane of the rotating panel at equal distances from the rotating panel, and maintain a uniform low air pressure state on the periphery of the rotating panel. For this reason, a deflection force is not exerted on the rotating panel, and the rotating panel maintains a stable rotation.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An illumination device comprising:
    a rotating panel including a plurality of transparent members having different light transmitting characteristics sequentially arranged in a rotational direction of the rotating panel, adjacent transparent members in the rotational direction being connected at connective areas; and
    a plurality of light shield members, each light shield member straddling a corresponding connective area and being adhered to a surface of respective adjacent transparent members for sealing between the respective adjacent transparent members,
    wherein said light shield members have belt like straight line configuration corresponding radius of the rotating panel.

2. An illumination device as claimed in claim 1, further comprising a drive source which rotatably drives the rotating panel.

3. An illumination device as claimed in claim 1, further comprising a light source,
    wherein said plurality of the transparent members comprises at least three transparent members which modulate light emitted from the light source into light of red, green and blue colors.

4. An illumination device as claimed in claim 1, further comprising a light source and a shutter member,
    wherein light emitted from the light source arrives at the shutter member via the rotating panel.

5. An illumination device as claimed in claim 4, wherein said shutter member includes a PLZT element.

6. An illumination device as claimed in claim 1 is included in a printer.

7. An illumination device comprising:
- a rotating panel including a plurality of transparent members having different light transmitting characteristics sequentially arranged in a rotational direction of the rotating panel; and
- a housing for accommodating the rotating panel, said housing having two mutually opposing surfaces parallel to a rotational plane of the rotating panel, and being provided with an airflow inlet near a rotational axis of the rotating panel on a surface nearer to the rotating panel among the two surfaces,
- wherein a plurality of airflow inlets are disposed at equal intervals on a circumference centered on a position corresponding to a rotational axis of the rotating panel.

8. An illumination device as claimed in claim 7, further comprising a filter provided at the airflow inlet.

9. An illumination device as claimed in claim 7, further comprising a drive source which rotatably drives the rotating panel.

10. An illumination device as claimed in claim 7, further comprising a light source,
- wherein said plurality of the transparent members comprises at least three transparent members which modulate light emitted from the light source into light of red, green and blue colors.

11. An illumination device as claimed in claim 7, further comprising a light source and a shutter member,
- wherein light emitted from the light source arrives at the shutter member via the rotating panel.

12. An illumination device as claimed in claim 11, wherein said shutter member includes a PLZT element.

13. An illumination device as claimed in claim 7 is included in a printer.

14. An illumination device comprising:
- a rotating panel including a plurality of transparent members having different light transmitting characteristics sequentially arranged in a rotational direction of the rotating panel; and
- a housing for accommodating the rotating panel, said housing having two mutually opposing surfaces parallel to a rotational plane of the rotating panel, and being provided with an airflow inlet near a rotational axis of the rotating panel on a surface nearer to the rotating panel among the two surfaces,
- wherein said housing is provided with an airflow outlet near an exterior circumference of the rotating panel on the surface provided with the airflow inlet.

15. An illumination device as claimed in claim 14, wherein said housing is provided with a pipe which connects the airflow inlet and the airflow outlet.

16. An illumination device as claimed in claim 14, wherein a plurality of airflow inlets and airflow outlets is disposed at equal intervals on respective circumferences centered on a position corresponding to a rotational axis of the rotating panel.

* * * * *